United States Patent
Jalili

(10) Patent No.: US 9,141,820 B2
(45) Date of Patent: Sep. 22, 2015

(54) NETWORK-BASED SERVICE CONTENT PROTECTION

(71) Applicant: Adobe Systems Incorporated, San Jose, CA (US)

(72) Inventor: Reza Jalili, Sandy, UT (US)

(73) Assignee: Adobe Systems Incorporated, San Jose, CA (US)

(*) Notice: Subject to any disclaimer, the term of this patent is extended or adjusted under 35 U.S.C. 154(b) by 42 days.

(21) Appl. No.: 13/951,294

(22) Filed: Jul. 25, 2013

(65) Prior Publication Data

US 2015/0033013 A1 Jan. 29, 2015

(51) Int. Cl.
G06F 21/62 (2013.01)
H04L 29/06 (2006.01)

(52) U.S. Cl.
CPC ........ *G06F 21/6209* (2013.01); *G06F 21/6218* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2003/0105734 A1* | 6/2003 | Hitchen et al. | 707/1 |
| 2004/0103202 A1* | 5/2004 | Hildebrand et al. | 709/229 |
| 2006/0143200 A1* | 6/2006 | Powlette | 707/100 |
| 2007/0083604 A1* | 4/2007 | Zimman et al. | 709/207 |
| 2008/0010336 A1* | 1/2008 | Nishizawa et al. | 709/201 |
| 2009/0100268 A1* | 4/2009 | Garcia et al. | 713/184 |
| 2010/0119067 A1* | 5/2010 | Yoshio et al. | 380/243 |
| 2011/0270761 A1* | 11/2011 | Graham et al. | 705/51 |
| 2012/0192271 A1* | 7/2012 | Srivastava et al. | 726/22 |
| 2012/0260108 A1* | 10/2012 | Lee | 713/191 |
| 2013/0031629 A1* | 1/2013 | Srivastava et al. | 726/22 |
| 2013/0097421 A1* | 4/2013 | Lim | 713/167 |
| 2013/0166921 A1* | 6/2013 | Vijay et al. | 713/191 |
| 2013/0297662 A1* | 11/2013 | Sharma et al. | 707/827 |
| 2014/0006540 A1* | 1/2014 | Rao et al. | 709/213 |
| 2014/0281526 A1* | 9/2014 | Lindteigen et al. | 713/168 |
| 2014/0304505 A1* | 10/2014 | Dawson | 713/165 |

OTHER PUBLICATIONS

Bennett et al., GBS Next Generation Architecture, copy right 2003, IEEE, 6 pages.*
Chase et al., Improving Privacy and Security in Multi-Authority Attribute-Based Encryption, copy right 2009, Microsoft Research, 10 pages.*
Jeong et al., An Efficient Protection Scheme of Digital Contents under Mobile Devices, copy right 2013, Korea, 6 pages.*
Kotzanikolaou, Data Retention and Privacy in Electronic Communications, copy right 2008, IEEE, 7 pages.*

* cited by examiner

*Primary Examiner* — Jeffrey Pwu
*Assistant Examiner* — Baotram Tran
(74) *Attorney, Agent, or Firm* — Wolfe-SBMC

(57) ABSTRACT

Network-based service content protection techniques are described. In one or more implementations, content is edited locally by a computing device. The edited content is automatically encrypted without any user intervention by the computing device using an encryption credential, e.g., encryption key or other secret. The automatic encryption is performed responsive to a request to store the content at a network-based service provider such that the encrypted content can only be decrypted and accessed with the encryption credential and the encrypted content is uploaded to the network-based service provider.

22 Claims, 6 Drawing Sheets

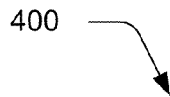

400

402
Expose a dynamic runtime routine that is executable locally at a computing device to edit content in association with one or more network-based services of a service provider, the dynamic runtime routine configured to protect the content automatically and without user intervention from access by the service provider

404
Store the content encrypted by the dynamic runtime routine automatically and without user intervention such that the content is not accessible by the service provider

502
Obtain encrypted content via a network by a computing device, the encrypted content made available via a network-based service by a service provider

504
Form a request configured for communication to the service provider to access the encrypted content as part of the network-based service

506
Obtain a dynamic runtime routine from the service provider responsive to the request

508
Form a request through execution of the dynamic runtime routine to obtain the content

510
Decrypt the encrypted content for access locally at the computing device

512
Manage the local access to the decrypted content by the computing device such that responsive to a request to communicate the decrypted content outside of the computing device, the decrypted content is encrypted automatically and without user intervention

*Fig. 5*

NETWORK-BASED SERVICE CONTENT PROTECTION

BACKGROUND

Users have access to a wide variety of network-based services, e.g., web services. These services may support a wide variety of user interaction with a wide variety of different types of content. This may include word processing services to compose documents, a spreadsheet service to configure a spreadsheet, an image editing service configured to create and edit images, sound editing services, and so on. For example, a user may utilize a word processing service to create a document, a copy of which may be maintained by the service "over the cloud."

In some instances, however, users may desire to store sensitive information as part of this access. Continuing with the previous example, the user may compose a document that includes sensitive financial data, personal information, and so on. Although a service provider of the network-based services may employ techniques to protect this data from third-parties (e.g., malicious outside parties), there are no such protections from a service provider from accessing the data, itself. Rather, such protection generally relies on an agreement between the user and the service provider that the service provider will not "peek" at the data. However, concerns that one or more technicians associated with the service provider may not comply with this agreement could cause users to forgo use of such functionality to store sensitive information.

SUMMARY

Network-based service content protection techniques are described. In one or more implementations, content is edited locally by a computing device. The edited content is automatically encrypted without any user intervention by the computing device using an encryption credential, e.g., encryption key or other secret. The automatic encryption is performed responsive to a request to store the content at a network-based service provider such that the encrypted content can only be decrypted and accessed with the encryption credential and the encrypted content is uploaded to the network-based service provider.

In one or more implementations, encrypted content is obtained via a network by a computing device, the encrypted content made available via a network-based service by a service provider. The encrypted content is decrypted for access locally at the computing device. The local access to the decrypted content is managed by the computing device such that responsive to a request to communicate the decrypted content outside of the computing device, the decrypted content is encrypted automatically and without user intervention.

In one or more implementations, content is accessed locally at a computing device through execution of a dynamic runtime routine, the dynamic runtime routine obtained from a network-based service of a service provider via a network. Responsive to a request to expose the content external to the computing device back to the service provider via the network, the content is encrypted automatically and without user intervention using one or more cryptographic keys that are not accessible by the service provider.

In one or more implementations, a system includes at least one module implemented at least partially in hardware, the at least one module configured to expose a dynamic runtime routine that is executable locally at a computing device to edit content in association with one or more network-based services of a service provider. The dynamic runtime routine is configured to protect the content automatically and without user intervention from access by the service provider. The system also includes one or more modules implemented at least partially in hardware, the one or more modules configured to store the content encrypted by the dynamic runtime routine automatically and without user intervention such that the content is not accessible by the service provider.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure in an example implementation in which a service provider exposes a dynamic runtime routine configured to support access to services of the service provider as well as protect content from access by the service provider.

FIG. 5 is a flow diagram depicting a procedure in an example implementation in which local protection of content by a computing device as part of access to a network-based service is described.

DETAILED DESCRIPTION

Overview

Network-based services may be used to interact with and store a variety of different data. Although that data may be protected from third-parties, a service provider of the network-based services may still access this data, which may give some trepidation to users that desire to store sensitive data as part of the interaction with the service.

Techniques are described to protect data as part of a network-based service. For example, a user may interact with a spreadsheet service of a service provider via a network to obtain a spreadsheet previously stored at the service provider. To support this interaction, a dynamic runtime routine may be downloaded from the service provider for execution as part of a user's browser. The dynamic runtime routine may then be executed to obtain the spreadsheet in an encrypted form and use an encryption/decryption module to decrypt the spreadsheet. This may include prompting a user for an input that may be used as a cryptographic key to decrypt the spreadsheet. The spreadsheet may then be viewed and edited locally by a user of the computing device.

The cryptographic key may be stored as part of a runtime of the dynamic runtime routine and leverage to protect the spreadsheet automatically and without user intervention. For example, the cryptographic key may be used to encrypt the spreadsheet automatically and without user intervention responsive to selection by a user of an option to store the spreadsheet to storage of the service provider. In another example, scheduled backup saves may also employ the cryptographic key. Thus, these saves may be performed without reentering of the cryptographic key by the user, the keys not being stored outside of the computing device. Other examples are also contemplated, such as to secure the cryptographic keys in secure storage without manual entry by a user, obtain the keys from a trusted third-party provider, and so on, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
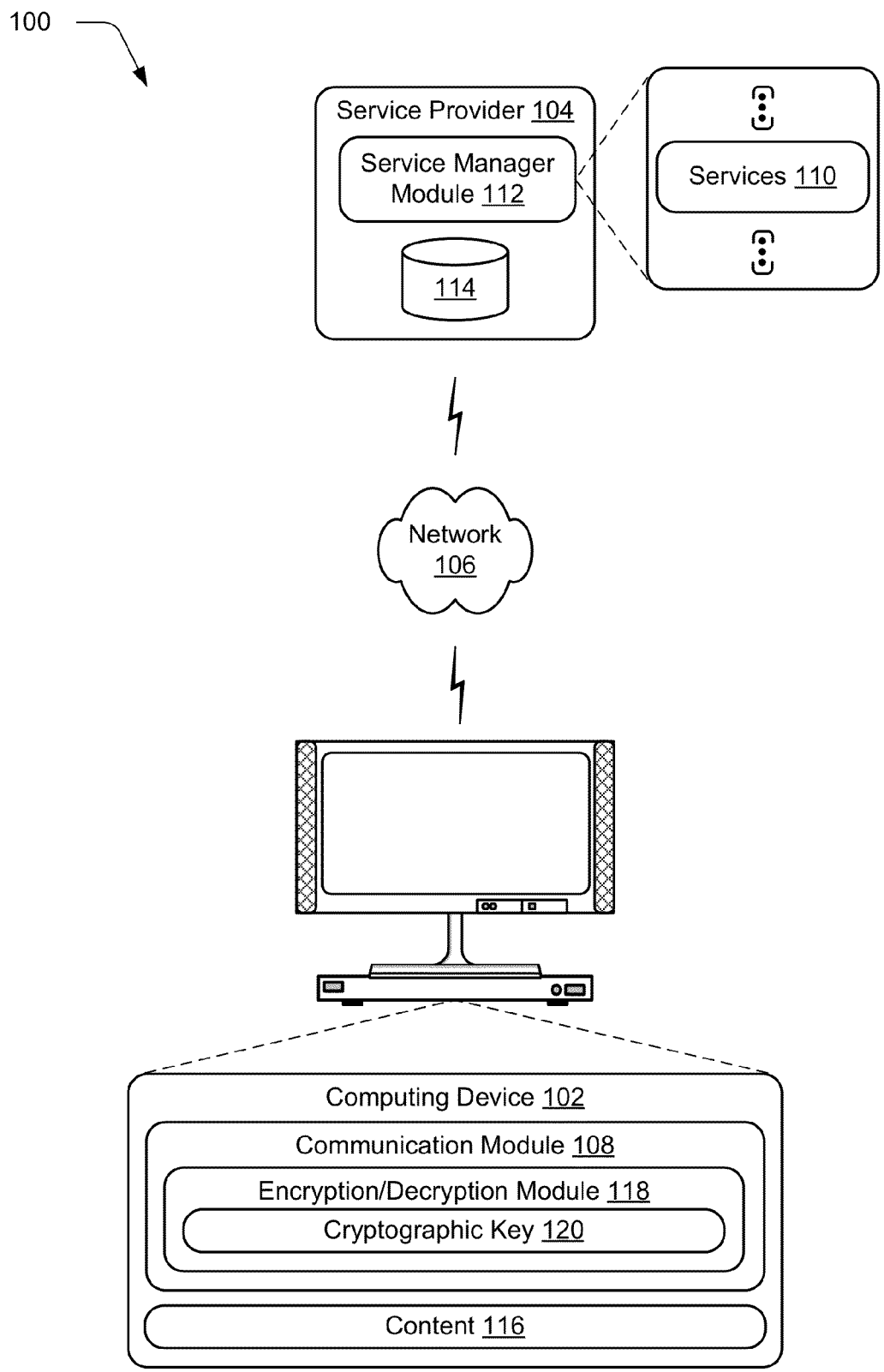
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 and a service provider 104 that are communicatively coupled via a network 106. The computing device 102 as well as computing devices that implement the service provider 104 may be configured in a variety of ways.

The computing devices, for instance, may be configured as a desktop computer, a laptop computer, a mobile device (e.g., assuming a handheld configuration such as a tablet or mobile phone), and so forth. Thus, the computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers of the service provider 104 utilized by a business to perform operations "over the cloud" as further described in relation to FIG. 6, a tablet and a peripheral device, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108. The communication module 108 is representative of functionality to communicate via the network 106, such as with one or more services 110 of the service provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The service provider 104 is illustrated as including one or more network-based services, illustrated and referred to as services 110 in the following discussion. The services 110 that are managed by a service manager module 112 to support a variety of different functionality. The services 110 (e.g., web services), for instance, may be configured to support word processing, spreadsheets, graphics composition, graphics editing, sound editing, presentations, multimedia editing, and so on. Thus, a variety of different types of content may be edited (e.g., created and/or modified) by the services 110, which may be maintained in storage 114 of the service provider 104.

As previously described, in some instances users may wish to interact with sensitive content via the services 110, but conventional techniques that relied on trusting the service provider 104 not to "peek" at data stored in storage could cause users to forgo use of these services. For example, a user may enter financial information as part of an accounting or tax service and therefore have concerns about an ability to protect this information from third parties as well as from the service, itself. Accordingly, network-based service content protection techniques may be employed to protect content 116 of a user from access by a service provider 104 that stores the content 116 in storage 114 as part of providing the services 110.

The communication module 108, for instance, may include an encryption/decryption module 118 that is representative of functionality to protect the content 116 from exposure "outside" a hardware boundary of the computing device 102, e.g., via the network 106. The encryption/decryption module 118 may be configured to work in conjunction with the communication module 108 to automatically and without user intervention encrypt content 116 before transfer via the network 106 using one or more cryptographic keys 120.

Likewise, the encryption/decryption module 118 may also decrypt the content 116 when received from the service provider 104 automatically and without user intervention as part of interaction with the services 110. In this way, the content 116 may be protected from access by the service provider 104 by restricting access of the service provider 104 to the cryptographic key 120 without interfering with a user's interaction with the content 116. The content protection techniques may be implemented in a variety of ways, an example of which is described as follows and shown in a corresponding figure.

Figure 2:
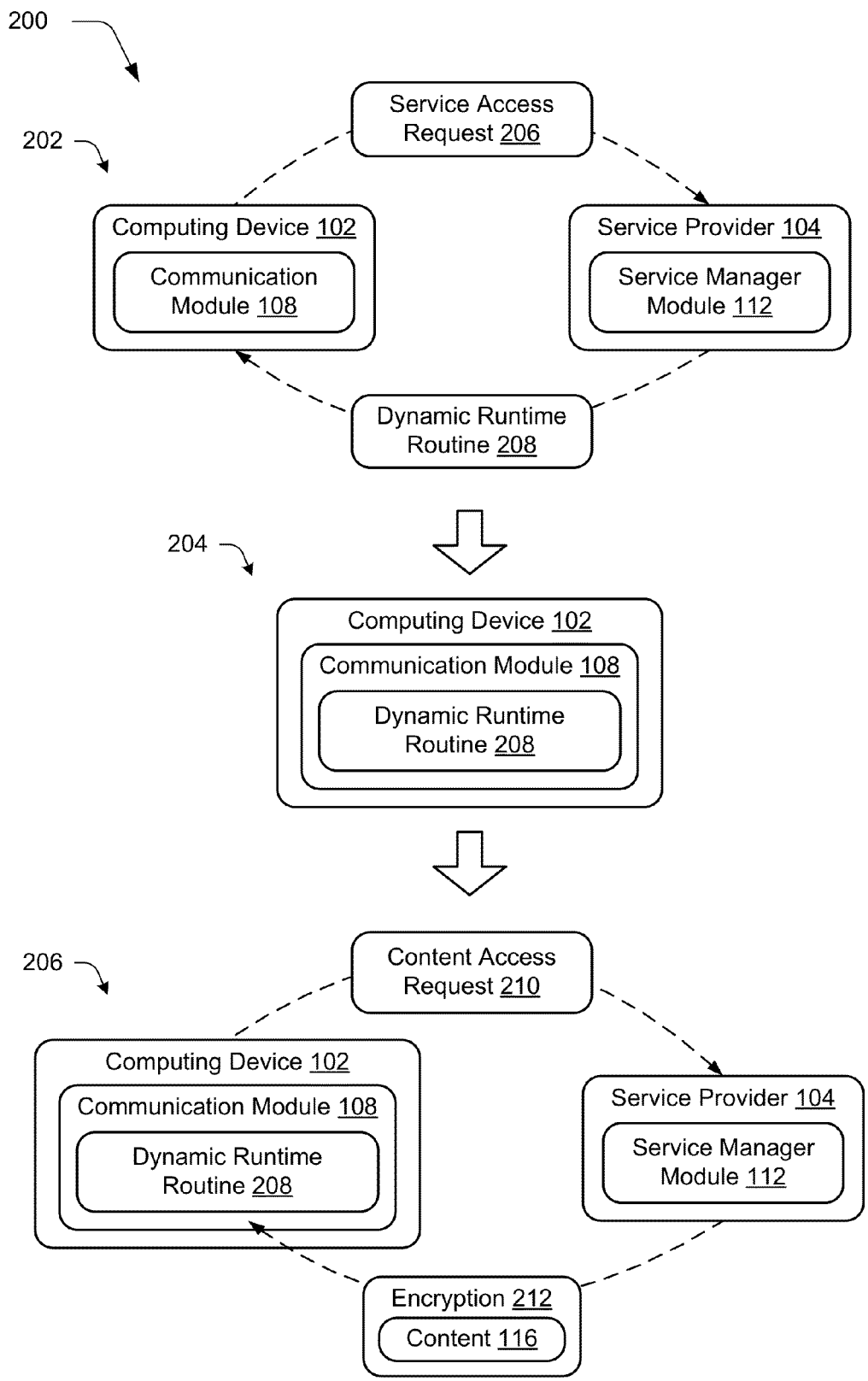
FIG. 2 depicts a system that is configured to obtain encrypted content responsive to a request to access the content as part of a network-based service.

FIG. 2 depicts a system 200 that is configured to obtain encrypted content responsive to a request to access the content as part of a network-based service. This system 200 is shown using first, second, and third stages 202, 204, 206. At the first stage 202, a request is received to access content via a service. For example, a user may execute communication module 108 functionality of a browser to access a network-based service. Accordingly, a service access request 206 may be formed and communication via the network 106 to the service provider 104. The service manager module 112 may then provide a dynamic runtime routine 208 in response to the request that corresponds to the requested service. The dynamic runtime routine 208 may be configured in accordance with a variety of different dynamic runtime languages, such as JavaScript®, Visual Basic Script®, Java®, Per and so on.

At the second stage 204, the dynamic runtime routine 208 is loaded by the computing device 102. The dynamic runtime routine 208 is representative of functionality that is executed locally at the computing device 102 as part of interaction with the services 112. For example, the dynamic runtime routine 208 may provide word processing, spreadsheet, presentation, and other functionality that may be used to edit content, e.g., compose, view, modify, and so on. Although the dynamic runtime routine 208 is illustrated as loaded as part of the communication module 108, a variety of other examples are also contemplated, such as a stand-alone application, and so on.

At the third stage 206, the dynamic routing routine 208 is executed to call back for the content using a content access request 210. In response, the service manager module 112 provides content 116 that is encrypted 212 such that although the service provider 104 is able to identify a name of the content 116, the service provider 104 is not able to "peek" and see "what" is included in the content 116. The encryption 212 of the content 116 may then be removed automatically and without user intervention by the dynamic runtime routine 208, further description of which may be found in the following discussion and shown in the corresponding figure.

Figure 3:
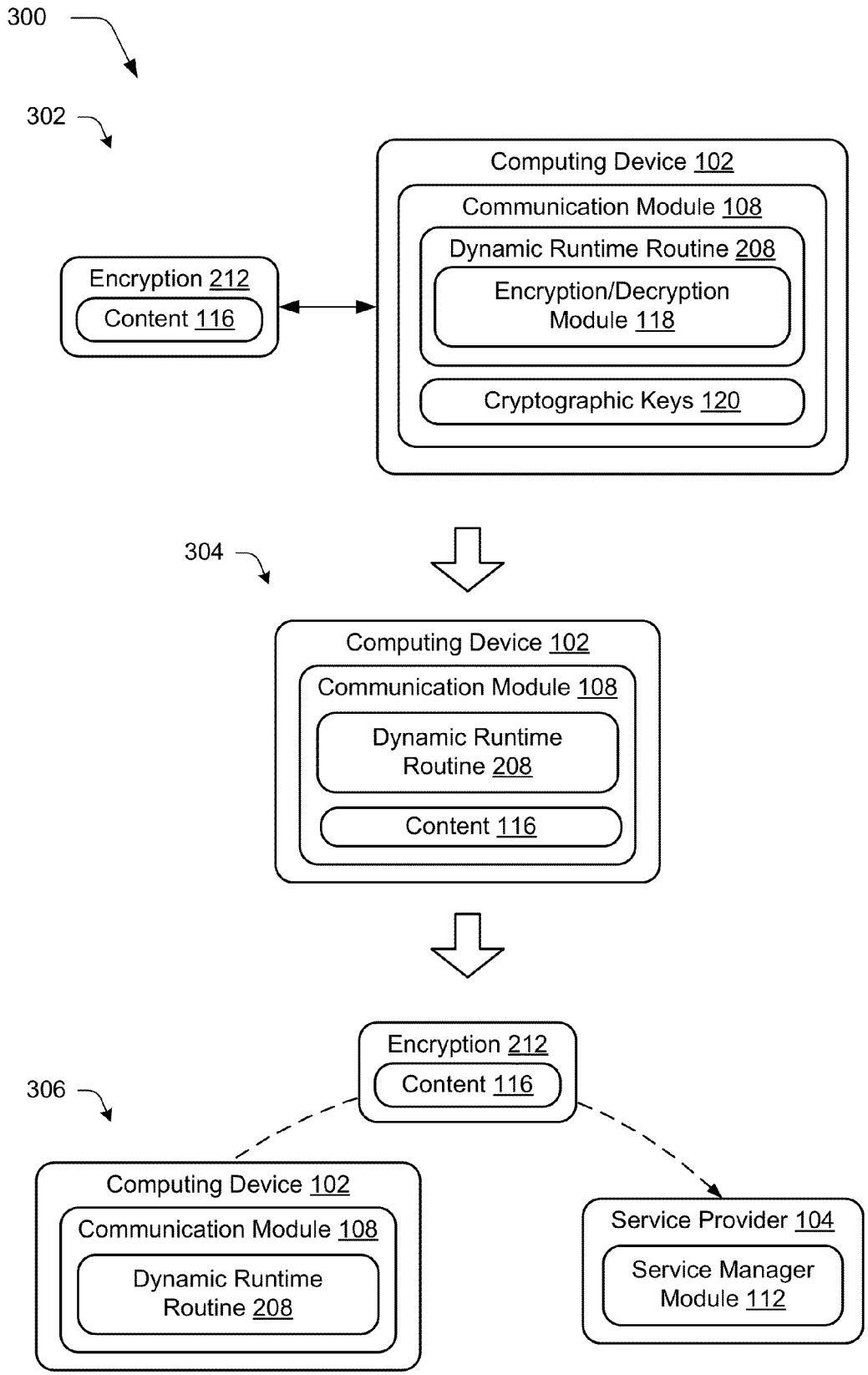
FIG. 3 depicts a system in an example implementation in which content is decrypted for local access and re-encrypted to protect against access outside a software/hardware boundary of a computing device.

FIG. 3 depicts a system 300 in an example implementation in which content is decrypted for local access and re-encrypted to protect against access outside a hardware boundary of a computing device 102. This system 300 is also illustrated using first, second, and third stages 302, 304, 306. At the first stage 302, content 116 that is encrypted 212 is received by the computing device 102. In response, a dynamic runtime routine 208 of the communication module 108 employs an encryption/decryption module 118 to remove the decryption 212 automatically and without user intervention using the cryptographic keys 120.

The cryptographic keys 120 may be obtained in a variety of different ways. For example, the encryption/decryption module 118 of the dynamic runtime routine 208 may prompt a user to manually enter the cryptographic keys 102, such as a user-supplied password. In another example, the cryptographic keys 120 may be obtained from a third-party service that is not directly accessible by the service provider 104. The third-party service, for instance, may be a white-listed IP that is configured to maintain the cryptographic keys 120. In a further example, the computing device 102 may include secure storage that is configured to retain the cryptographic keys 120 in hardware and not expose the cryptographic keys outside of the hardware, e.g., through performance of the encryption/decryption routines by the secure hardware element. A variety of other examples are also contemplated.

At the second stage 304, the content is decrypted 116 and accessed as part of the dynamic runtime routine 208. Thus, the content 116 is decrypted and maintained local as part of playback of the service. In this way, an in-device representation of the content 116 is obtained that is playable, editable, and so on.

At the third stage 306, a request is received to communicate the content 116 external to the computing device 102, e.g., outside a hardware boundary of the computing device 102. This request may be received in a variety of ways. For example, a user may select a "save" button which causes a copy of the content 116 to be automatically copied to the service provider 104. In another example, the dynamic runtime routine 208 may include auto-save functionality that is configured to perform a save of the content 116 at pre-defined intervals. Other examples are also contemplated without departing from the spirit and scope thereof.

In response, the dynamic runtime routine 208 may cause the content 116 to be re-encrypted 212, such as to employ the cryptographic keys 120. The dynamic runtime routine 208, for instance, may be configured to maintain the cryptographic keys 120 as part of the runtime. Therefore, these keys may be utilized automatically and without user intervention to re-encrypt the content 116. Thus, keys that were manually entered by a user, obtained from a white-listed IP, and so on may be utilized without re-obtaining the keys. Other examples are also contemplated without departing from the spirit and scope thereof.

Thus, in this example the dynamic runtime routine 208 that is configured to support interaction with the network-based services 110 of the service provider 104 may also be configured to protect content 116 from access by the service provider 104. In this way, users may be given a degree of confidence that their data is protected from access by malicious parties.

Additionally, techniques may be employed to even protect the file names of the content. For example, a directory of filenames may be maintained locally on a device and converted to a fileID (that is different than the filename) for accessing the associated content from the service provider. Therefore, the locally stored file stores and filenames and an associated fileID as supplied by the service provider for each encrypted item of content sent to it. Consequently, the service provider is only aware of the fileID and the associated encrypted content, whereas the computing device 102 is aware of the filename as well as the fileID, which may be used to request the associated content. Further discussion of these and other techniques may be found in relation to the following procedures.

Example Procedures

The following discussion describes network-based service content protection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

FIG. 4 depicts a procedure 400 in an example implementation in which a service provider exposes a dynamic runtime routine configured to support access to services of the service provider as well as protect content from access by the service provider. A dynamic runtime routine is exposed that is executable locally at a computing device to edit content in association with one or more network-based services of a service provider. The dynamic runtime routine is configured to protect the content automatically and without user intervention from access by the service provider (block 402). The service provider 102, for instance, may maintain dynamic runtime routines that are configured to support interaction with a respective services 110. Accordingly, these dynamic runtime routines may be exposed for use locally by computing devices that desire access to the services 110.

The content encrypted by the dynamic runtime routine automatically and without user intervention is stored such that the content is not accessible by the service provider (block 404). The dynamic runtime routine 208, for instance, may be configured to include an encryption/decryption module 118 to encrypt the content 116 using one or more cryptographic keys 120. In another instance, the encryption/decryption module 118 may be accessed by the encryption/decryption module 118 but is not communicated with the dynamic runtime routine 208, e.g., may be configured as part of the communication module 108. A variety of other instances are also contemplated.

The encryption/decryption module 118 may encrypt the content 116 responsive to a variety of different attempts to expose the content 116 outside a hardware boundary of the computing device 102, such as responsive to an auto-save, input from a user, and so on. Further discussion of an example of such techniques may be found in relation to the following description and corresponding figure.

FIG. 5 depicts a procedure 500 in an example implementation in which local protection of content by a computing device as part of access to a network-based service is described. Encrypted content is obtained via a network by a computing device, the encrypted content made available via a network-based service by a service provider (block 502). A computing device 102, for instance, may form a request to access content stored at a service provider 104 that is accessible via a network 106. In response, the service provider 104 may provide content 116 that is encrypted 212 such that the service provider 104 is not configured to access the content. This may be performed in a variety of ways.

For example, a request may be formed that is configured for communication to the service provider to access the encrypted content as part of the network-based service (block 504), e.g., through execution of a browser, application having network functionality, and so on. A dynamic runtime routine is obtained from the service provider responsive to the request (block 506), which may then be executed locally at the computing device 102. A request is then formed through execution of the dynamic runtime routine to obtain the content (block 508).

The encrypted content is decrypted for access locally at the computing device (block 510). Continuing with the previous example, the dynamic runtime routine, for instance, may obtain cryptographic keys and leverage an encryption/decryption module 118 to decrypt the content 116.

The local access to the decrypted content is managed by the computing device such that responsive to a request to communicate the decrypted content outside of the computing device, the decrypted content is encrypted automatically and without user intervention (block 512). The dynamic runtime routine, for instance, may be configured to cause encryption of the content 116 automatically and without user intervention responsive to receipt of an indication that the content 116 is to be communicated "outside" of the computing device 102. Thus, even though the content 116 may be communicated to and stored by the service provider 104, the service provider 104 is not able to access the content 116. A variety of other examples are also contemplated as previously described.

Example System and Device

Figure 6:
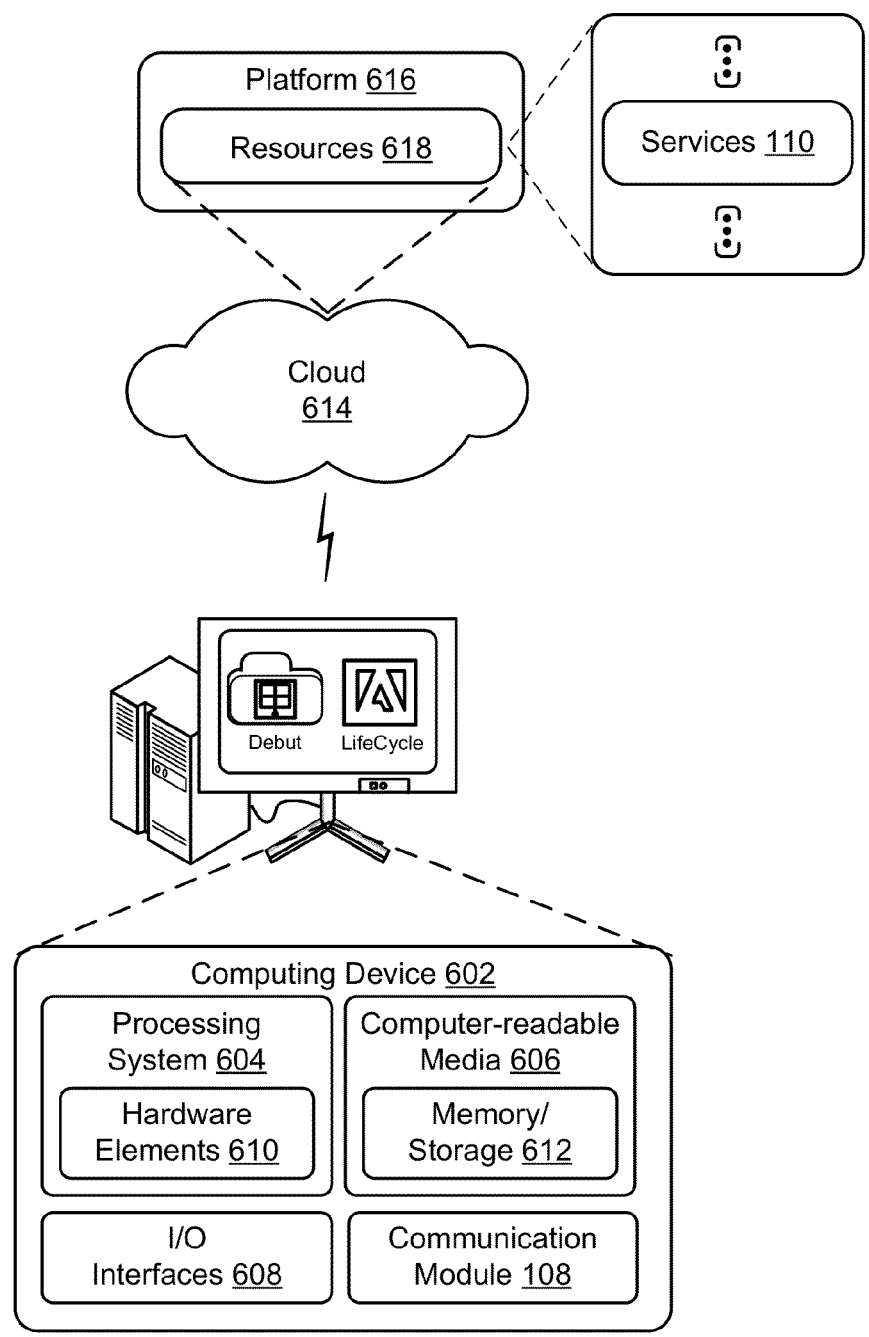
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the communication module 108 and services 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
    forming a service access request configured for communication to a service provider to access content as part of a network-based service;
    obtaining a runtime routine from the service provider responsive to the service access request that is configured to permit editing of the content at a computing device;
    forming a content access request through execution of the obtained runtime routine on the computing device to obtain the content;
    receiving the content on the computing device;
    editing the content locally on the computing device through execution of the obtained runtime routine;
    automatically encrypting the edited content without any user intervention by the computing device using an encryption credential through execution of the obtained runtime routine and responsive to a request to store the encrypted content at the service provider such that the encrypted content can only be decrypted and accessed with the encryption credential at the computing device;
    converting a filename of the content to an associated file identifier to protect the filename and to limit the service provider awareness to only the associated file identifier and the corresponding encrypted content;
    storing locally, on the computing device, the filename of the content and the associated file identifier; and
    uploading the encrypted content and the associated file identifier to the service provider.

2. The method as described in claim 1, wherein the encrypting is performed through use of the encryption credential that includes one or more cryptographic keys stored locally at the computing device.

3. The method as described in claim 2, wherein the one or more cryptographic keys are manually entered by a user at the computing device responsive to a prompt to decrypt the encrypted content.

4. The method as described in claim 2, wherein the one or more cryptographic keys are obtained from a third-party service that is accessible via a network, the one or more cryptographic keys not being directly accessible by the service provider from the third-party service.

5. The method as described in claim 2, wherein the one or more cryptographic keys are stored locally at the computing device in secure storage such that the one or more cryptographic keys are not exposed outside of the computing device.

6. The method as described in claim 1, further comprising decrypting the content obtained from the service provider.

7. A method comprising:
forming a service access request configured for communication to a service provider via a network to access encrypted content as part of a network-based service;
obtaining a runtime routine via the network from the service provider responsive to the service access request from a computing device;
forming a content access request through execution of the obtained runtime routine on the computing device to obtain encrypted content responsive to receipt of the service request by the service provider;
obtaining the encrypted content via the network by the computing device through execution of the obtained runtime routine, the encrypted content made available via a network-based service by the service provider responsive to receipt of the content access request;
decrypting the encrypted content for access locally at the computing device through execution of the obtained runtime routine;
managing the local access to the decrypted content by the computing device to edit the decrypted content such that responsive to a request to communicate the decrypted content outside of the computing device, the decrypted content is encrypted automatically and without user intervention through execution of the obtained runtime routine;
converting a filename of the decrypted content to an associated file identifier to protect the filename and to limit the service provider awareness to only the associated file identifier and the corresponding encrypted content; and
storing locally, on the computing device, the filename of the content and the associated file identifier.

8. The method as described in claim 7, wherein the decrypted content is encrypted automatically and without user intervention through use of one or more cryptographic keys stored locally at the computing device.

9. The method as described in claim 8, wherein the one or more cryptographic keys are manually entered by a user responsive to a prompt to decrypt the obtained encrypted content.

10. The method as described in claim 8, wherein the one or more cryptographic keys are obtained from a third-party service that is accessible via the network, the one or more cryptographic keys not being directly accessible by the service provider from the third-party service.

11. The method as described in claim 8, wherein the one or more cryptographic keys are stored locally at the computing device in secure storage such that the one or more cryptographic keys are not exposed outside of the computing device.

12. The method as described in claim 7, wherein the network-based service is configured to permit access to the content that includes editing of the content.

13. The method as described in claim 7, wherein the content is a document, spreadsheet, presentation, music, or graphic.

14. A method comprising:
forming a service access request configured for communication to a service provider to access content as part of a network-based service;
obtaining a runtime routine from the service provider responsive to the service access request that is configured to permit editing of the content at a computing device;
forming a content access request through execution of the runtime routine on the computing device to obtain the content;
receiving the content on the computing device;
accessing the content locally at the computing device through execution of the runtime routine;
converting a filename of the content to an associated file identifier to protect the filename and to limit the service provider awareness to only the associated file identifier and corresponding encrypted content;
storing locally, on the computing device, the filename of the content and the associated file identifier; and
responsive to a request to expose the content external to the computing device back to the service provider via the network, encrypting the content automatically and without user intervention using one or more cryptographic keys that are not accessible by the service provider through execution of the obtained runtime routine.

15. The method as described in claim 14, wherein the cryptographic keys are stored locally at the computing device.

16. The method as described in claim 15, wherein the one or more cryptographic keys are manually entered by a user responsive to a prompt to decrypt the encrypted content.

17. A system comprising:
at least one module implemented at least partially in hardware, the at least one module configured to expose a runtime routine received from a service provider that is executable locally at a computing device to edit content in association with one or more network-based services of the service provider, the runtime routine configured to protect the content automatically and without user intervention from access by the service provider;
one or more modules implemented at least partially in hardware, the one or more modules configured to:
store the content encrypted by the runtime routine automatically and without user intervention such that the content is not accessible by the service provider;
convert a filename of the content to an associated file identifier to protect the filename and to limit the service provider awareness to only the associated file identifier and the corresponding encrypted content; and
store locally, on the computing device, the filename of the content and the associated file identifier.

18. The system as described in claim 17, wherein the content is protected using one or more cryptographic keys.

19. The system as described in claim 18, wherein the one or more cryptographic keys are manually entered by a user responsive to a prompt to decrypt the encrypted content.

20. The system as described in claim 18, wherein the one or more cryptographic keys are obtained from a third-party service that is accessible via a network, the one or more cryptographic keys not being directly accessible by the service provider from the third-party service.

21. The system as described in claim 17, wherein the content is a document, spreadsheet, presentation, music, or graphic.

22. The system as described in claim 17, wherein the dynamic runtime routine is exposed for availability by the service provider responsive to a request to obtain the content.

* * * * *